US010921037B1

(12) United States Patent
Ellis et al.

(10) Patent No.: US 10,921,037 B1
(45) Date of Patent: Feb. 16, 2021

(54) CRYOGENIC LIQUID CHILLER WITH MULTI-FILL POINTS OPTIMIZED FOR EFFICIENCY, CAPABILITY, AND VERSATILITY

(71) Applicants: Daniel Scott Ellis, Provo, UT (US); William Grant Moon, Provo, UT (US); Steven Victor Boyce, Spanish Fork, UT (US); William J. Hancock, Vineyard, UT (US)

(72) Inventors: Daniel Scott Ellis, Provo, UT (US); William Grant Moon, Provo, UT (US); Steven Victor Boyce, Spanish Fork, UT (US); William J. Hancock, Vineyard, UT (US)

(73) Assignee: Reflect Scientific Inc., Orem, UT (US)

( * ) Notice: Subject to any disclaimer, the term of this patent is extended or adjusted under 35 U.S.C. 154(b) by 0 days.

(21) Appl. No.: 16/668,064

(22) Filed: Oct. 30, 2019

(51) Int. Cl.
*F25D 3/10* (2006.01)

(52) U.S. Cl.
CPC .................................... *F25D 3/10* (2013.01)

(58) Field of Classification Search
CPC ...... F25D 3/10; F17C 7/00; F17C 9/00; F17C 2221/014; F17C 2225/0161; F17C 13/026
See application file for complete search history.

(56) References Cited

U.S. PATENT DOCUMENTS

| | | | | |
|---|---|---|---|---|
| 2,646,667 A * | 7/1953 | Kromer | ................. | F25D 31/002 62/99 |
| 3,271,968 A * | 9/1966 | Karnath | ................... | A01J 9/04 62/59 |
| 5,415,001 A * | 5/1995 | Powars | ..................... | F17C 9/00 62/47.1 |
| 6,116,043 A * | 9/2000 | Clark | ........................ | A23L 3/10 62/376 |
| 6,691,608 B1 * | 2/2004 | Thompson | .............. | A23L 3/365 99/403 |
| 9,869,429 B2 * | 1/2018 | Drube | ........................ | F17C 7/04 |
| 2009/0294470 A1 * | 12/2009 | Lampe | ..................... | F17C 5/02 222/1 |
| 2014/0026597 A1 * | 1/2014 | Epstein | ..................... | F17C 9/00 62/48.2 |
| 2015/0251288 A1 * | 9/2015 | Kudaravalli | ....... | B23Q 11/1053 407/11 |
| 2016/0053943 A1 * | 2/2016 | Kowalewski | ........ | B23Q 11/126 62/50.4 |
| 2016/0131307 A1 * | 5/2016 | Reese | ..................... | F17C 5/007 137/12 |
| 2017/0146176 A1 * | 5/2017 | Manley | .................. | F15B 1/021 |

\* cited by examiner

*Primary Examiner* — Brian M King
(74) *Attorney, Agent, or Firm* — Patent Law Office, PC; Bao Tran

(57) ABSTRACT

A cryogenic liquid chiller includes a vessel; at least one heat exchanger, which heat exchangers function independently of each other and are comprised of at least one parallel flow path; a pump to circulate liquid within the vessel; a fill pump; and a drain pump.

17 Claims, 6 Drawing Sheets

1 Heat Exchanger

2 Heat Exchangers

3 Heat Exchangers

4 Heat Exchangers

CRYOGENIC LIQUID CHILLER WITH MULTI-FILL POINTS OPTIMIZED FOR EFFICIENCY, CAPABILITY, AND VERSATILITY

FIELD OF INVENTION

The preferred embodiment chills large quantities of liquid using a cryogen to absorb thermal energy from the system. The preferred embodiment can be filled to multiple levels and can optimize cryogen use for either faster cooling or efficiency.

BACKGROUND OF THE INVENTION

This invention has the advantage over current state-of-the-art liquid chillers in that it significantly reduces the time required to chill liquids to ultra-low temperatures (such as −90° C.) by several hours. The invention also has the advantage over current state-of-the-art liquid chillers in that it can have a variety of configurations to either maximize cryogen utilization efficiency or minimize time per cycle. The non-obvious design is accomplished by an innovative scheme to increase circulation, increase cryogen mass flow rate, and give added control to the user over the heat exchangers.

The extraction of cannabinoids, terpenes, aromatic oils, and like substances is accomplished by the same basic principle, namely, by applying a solvent to the appropriate plant material. The solvent extracts specific compounds from the plant material and then the solvent is removed from the extracted compounds, leaving behind just the compounds. The process of extraction is essential for many industries.

Each individual compound with potential to be extracted has differing parameters in which it is best extracted. These parameters can include temperature and solvent type. For example, CBD may be best extracted by ethanol at −60° C. while a type of essential oil is best extracted by hexane at −10° C. More than one compound, including unwanted compounds, are typically extracted during an extraction process, depending upon the extraction parameters. For example, chlorophyll is extracted by ethanol at temperatures exceeding that of −40° C. The precise parameter control, specifically temperature, is a sought-after capability.

Some extraction procedures include more than one step, such as the winterization of CBD after $CO_2$ extraction. In summary, many different processes and procedures are necessary to extract the plethora of different compounds that industries use. Typically, extraction equipment is limited to one or a few different processes, due to their limited range of parameters and capabilities. For example, it is common to extract CBD with ethanol that has been stored in large walk-in freezers at −30° C. The only parameter that can be changed is temperature, and the walk-in freezer has limited capability to effectively chill ethanol due to the time it takes to passively chill ethanol in walk-in freezers, to move the ethanol safely in and out of the freezer, and the freezer's own temperature range, which is often only −40° C.

Extraction procedures are often limited by the temperature at which solvent chillers are able to go as well as the time it takes for these chillers to chill solvents to the temperature required. Thus, a versatile, powerful, and quick solvent chiller is desired.

The majority of solvent chillers are mechanical, meaning that they use a typical thermodynamic heat engine cycle to chill solvents. These mechanical chillers are often limited in their effective temperature range due to the relatively high boiling points of common refrigerants used in such systems. Mechanical systems also have notoriously short life-spans and high maintenance costs. Thus, alternative methods to mechanical systems are desired.

SUMMARY

In one embodiment, a liquid chiller includes a vessel; at least one heat exchanger within the vessel, wherein the heat exchangers are coupled to a pressurized cryogen source, which pressure causes cryogen flow within the heat exchangers; wherein each heat exchanger is comprised of at least one flow path, which flow paths are in parallel; wherein the heat exchangers function independently of one another; a pump to circulate liquid, which liquid is within the vessel; a fill pump; and a drain pump.

In another embodiment, a liquid chiller comprises:
an insulated vessel;
at least one heat exchanger within the vessel,
  wherein the heat exchangers are coupled to a pressurized liquid nitrogen,
    which pressure causes liquid nitrogen flow within the heat exchangers,
  wherein each heat exchanger is comprised of at least one flow path,
    which flow paths are in parallel, and
  wherein the heat exchangers function independently of one another;
a circulation pump to circulate liquid, which liquid is within the vessel,
  wherein the liquid is pumped from the vessel through at least one circulation inlet, and
  wherein the liquid is pumped into the vessel through at least one circulation outlet;
at least one cryogen valve coupled to the heat exchangers,
  wherein the cryogen valves control which heat exchangers have active liquid nitrogen flow;
a thermocouple coupled to each flow path;
a fill pump;
a drain pump;
a manual valve; and
a check valve.

In another embodiment, a cryogenic liquid chiller is designed to chill varying levels of liquid at an extremely fast rates through the use of one or more heat exchangers coupled to a cryogen.

One embodiment relies upon effective use of Nitrogen to chill the liquid. The effectivity of Nitrogen is enhanced by maintaining the liquid Nitrogen temperatures of down to −196 degrees C. throughout a major portion of the heat exchanger and not just at the entry port. When liquid Nitrogen absorbs energy too quickly, it phase-changes to a gas, which phase has an increased temperature and lower cooling ability, thus decreasing the effectiveness of the Nitrogen in cooling applications. A special design is employed to keep the Nitrogen in an extremely cold liquid condition throughout the entire heat exchanger to maintain the liquid Nitrogen's exceptional energy absorption capabilities. This is accomplished by using components that deliver extremely high flow cryogen: a high-pressure liquid Nitrogen source, a large cross-sectional flow path, a novel heat exchanger design, and at least one high-flow type solenoid valve.

One embodiment contains a heat exchanger designed for the increased viscosity of Ethanol in extremely low temperature conditions has such a design that limits the ability of the heat exchanger to trap the viscous Ethanol even with increased convection. An example of a heat exchanger with great ability to trap viscous Ethanol would be a typical heat exchanger where many fins are placed parallel to each other. Ethanol congeals between these fins and effectively decreases the surface area of the heat exchanger significantly, as well as limiting the heat transfer from the bulk of the Ethanol to the heat exchanger. An example of a heat exchanger with limited ability to trap congealed Ethanol would be one consisting of spiral tubing. Ethanol that does congeal on the surface of the heat exchanger isn't shielded from the liquid flow around it and cannot inhibit the heat exchangers ability to transfer heat from the Ethanol. The preferred embodiment has a heat exchanger with limited ability to trap congealed Ethanol.

One embodiment relies upon the capability of the heat exchangers to function independently to give the chiller added versatility in its chilling performance. This capability allows for one heat exchanger to be engaged while the others remain disengaged to ensure maximum efficiency of cryogen usage or to limit how much cryogen is used. It also allows for multiple heat exchangers to be engaged in order to minimize chilling time when efficiency or usage aren't as important of factors.

Advantages of the cryogenic liquid chiller include simultaneously increased cooling capability, cryogen utilization efficiency, and temperature control.

DESCRIPTION

Figure 1:
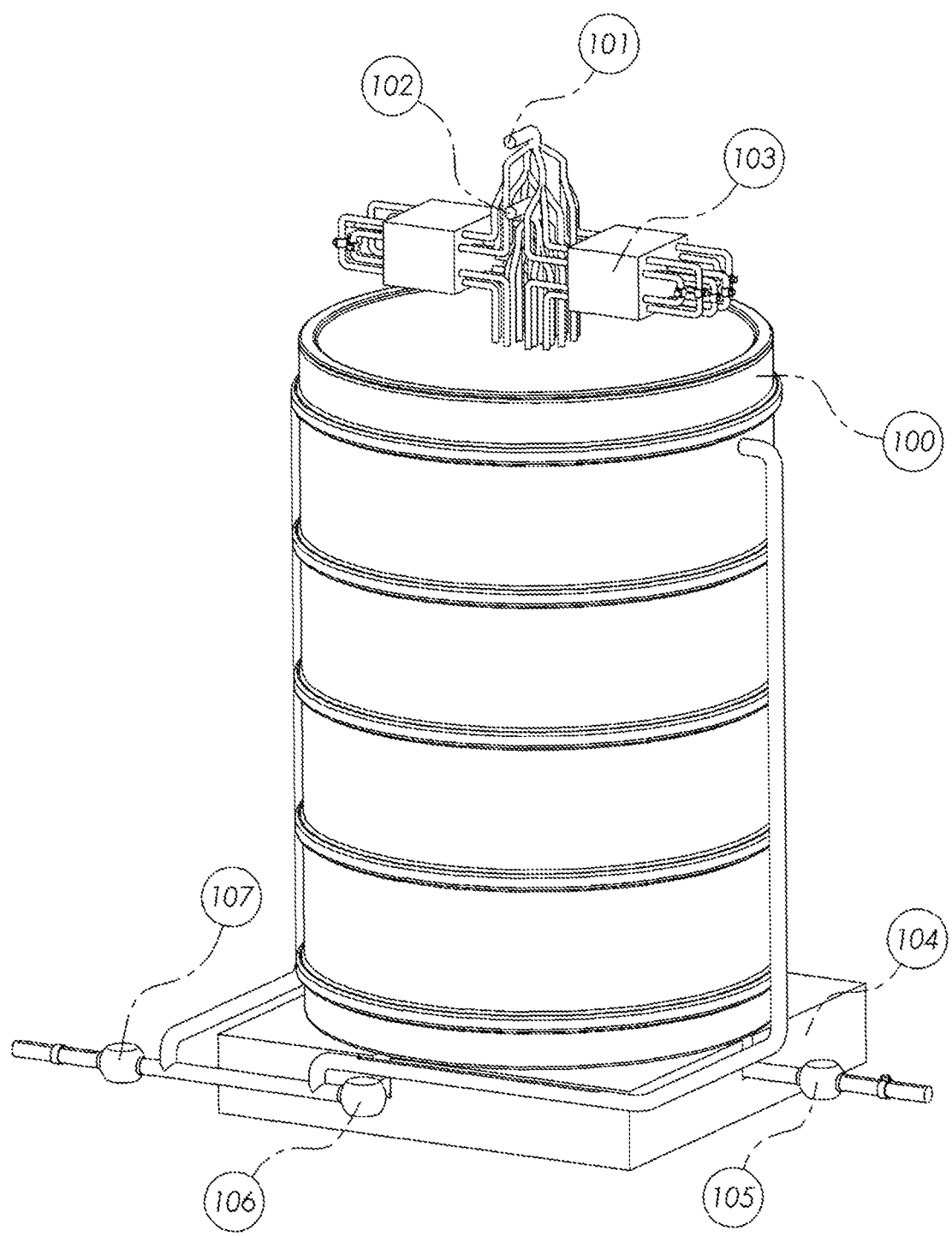
FIG. 1 is an exemplary 3D perspective view of the cryogenic liquid chiller.
Figure 2:
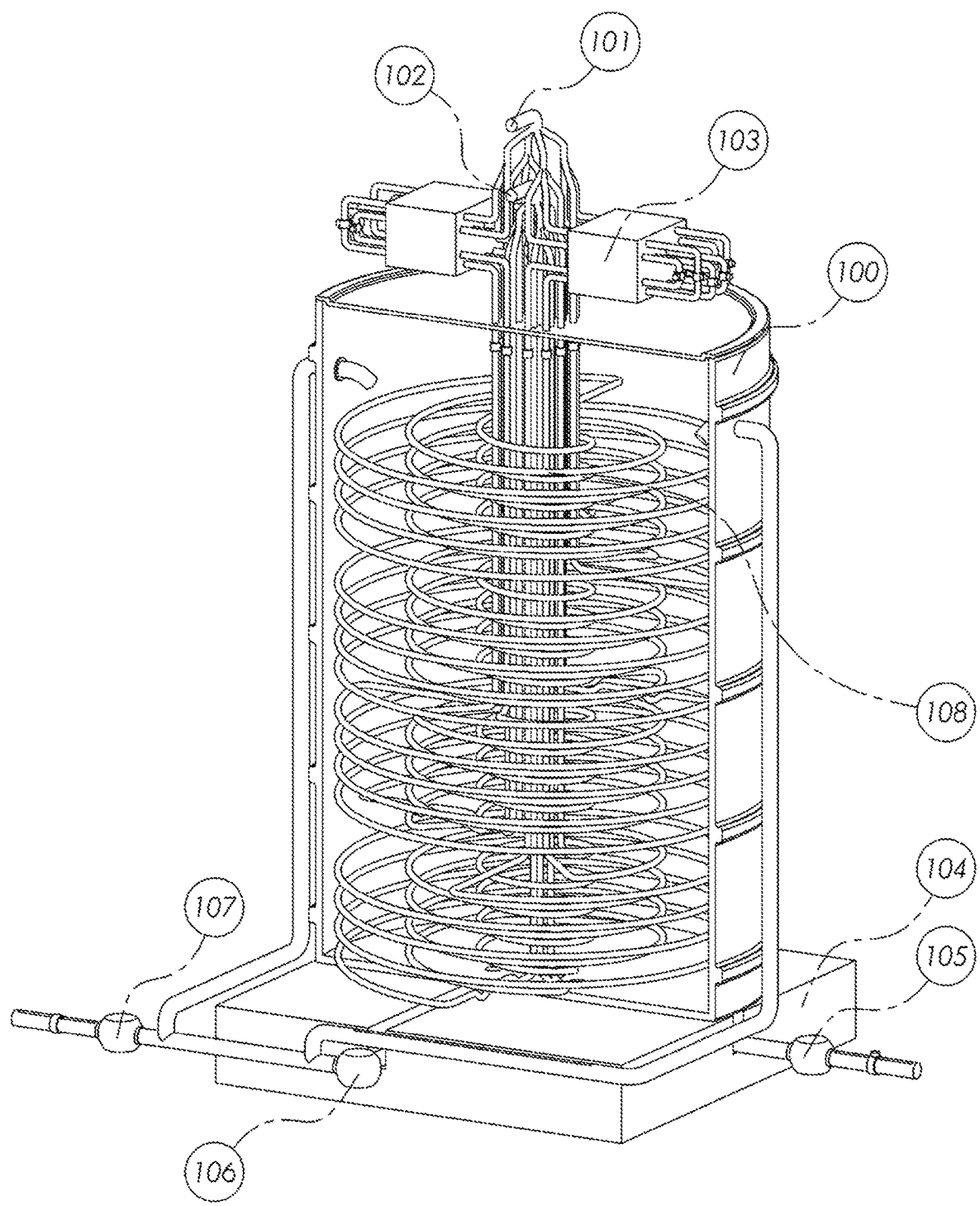
FIG. 2 is an exemplary cutaway 3D perspective view of the cryogenic liquid chiller.

A detailed description of the preferred embodiment is provided herein. It is to be understood, however, that the preferred embodiment may be embodied in various forms. Therefore, specific details disclosed herein are not to be interpreted as limiting, but rather as a basis for the claims and as a representative basis for teaching one skilled in the art how to employ the preferred embodiment in virtually any appropriately detailed system.

Now referring to FIGS. 1 through 5, the preferred embodiment is a cryogenic liquid chiller with a vessel 100 to contain the liquid to be chilled. Four heat exchangers 108 are within the vessel 100, typically to be submersed in the liquid to be chilled. These heat exchangers 108 function independently of each other and operate in parallel. Each heat exchanger 108 consists of three flow paths 110 which operate in parallel. The heat exchangers 108 are coupled to a cryogen inlet 102, which cryogen inlet 102 is coupled to a cryogen source 117. The cryogen source 117 is pressurized liquid nitrogen. A cryogen valve 109 is coupled to each flow path 110 to control when cryogen flows through the flow paths 110. The cryogen leaves through a cryogen outlet 101. A cryogen valve heat exchanger 103 is coupled to the flow paths 110 such that after cryogen flows through the heat exchangers 108, or in other words after cooling the liquid within the vessel 100, it flows through the cryogen valve heat exchanger 103 and increases in temperature to a point where the cryogen valves 109 won't fail. A thermocouple 111 is coupled to each flow path 110 at a location prior to the cryogen valve heat exchanger 103 but after the point where the cryogen within the flow path 110 has already cooled the liquid within the vessel 100. When the temperature at this location on a flow path 110 reaches below a specified value, the cryogen valve 109 associated with this flow path 110 closes and stops cryogen from flowing in the flow path 110. Once the temperature at this location on a flow path 110 reaches above a specified value, the cryogen valve 109 associated with this flow path 110 opens and allows cryogen to flow in the flow path 110.

The vessel 100 is placed on insulation 104 to prevent heat gain from the environment. Additionally, insulation can be placed around the vessel 100 for the same purpose (not shown).

Two circulation outlets 113 are placed within the vessel 100 such that they are near the top of the liquid surface within the vessel 100. The circulation outlets 113 are angled to cause circular liquid motion within the vessel 100. A circulation inlet 112 is located at the bottom of the vessel 100. A circulation pump 106 connects the circulation inlet 112 and the circulation outlets 113 such that while the circulation pump 106 is active, liquid flows from the vessel 100, through the circulation inlet 112, through the circulation pump 106, and out the circulation outlets 113.

A fill pump 107 is coupled to the circulation outlets 113, circulation pump 106, and circulation inlet 112 such that while the fill pump 107 is active, liquid is drawn from a liquid source 116 into the vessel 100 through the circulation outlets 113 and circulation inlet 112. A check valve 114 is located between the liquid source 116 and the fill pump 107 such that liquid cannot move from the vessel 100 to the liquid source 116.

A drain pump 105 and manual valve 115 are coupled to the vessel 100 so that while the drain pump 105 is active and the manual valve 115 is open, liquid flows out of the vessel 100. If the manual valve 115 is closed, no liquid flows out of the vessel 100.

Figure 6:
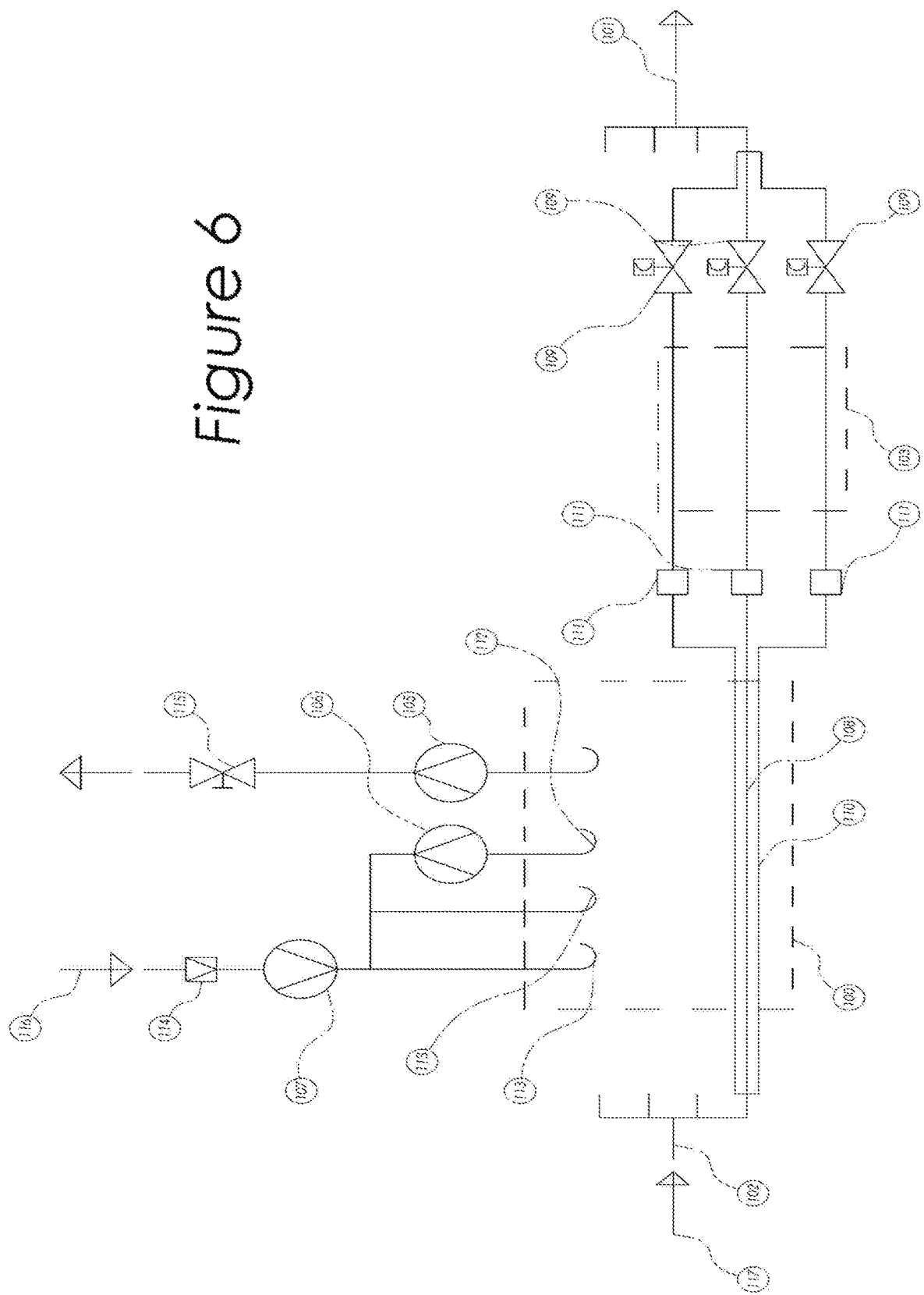
FIG. 6 is a plumbing schematic for one embodiment, including the cryogen, circulation, filling, and draining systems.

Now referring to FIG. 6, a fill pump 107 draws liquid from a liquid source 116, through a check valve 114, which check valve 114 doesn't allow liquid flow back into the liquid source 116, and into a vessel 100 through at least one circulation outlet 113 and/or a circulation inlet 112. A circulation pump 106 is connected to the circulation inlet 112 and the one or more circulation outlets 113 such that when the circulation pump 106 is actively pumping, liquid is drawn from the vessel 100 through the circulation inlet 112 and out through the one or more circulation outlets 113. The circulation flow path and the fill flow path can also be distinctly separate (not shown). A drain pump 105 and a manual valve 115 are attached to the vessel 100 in such a way that while the drain pump 105 is actively pumping and the manual valve 115 is open, liquid is drawn out of the vessel 100. When the manual valve 115 is closed, no liquid flow occurs.

A cryogen source 117 is attached to a cryogen inlet 102. The pressure of the cryogen source 117 causes cryogen flow into the cryogen inlet 102. At least one heat exchanger 108 is coupled to the cryogen inlet 102 in such a way as to allow cryogen flow from the cryogen inlet 102 through the heat exchanger 108. If more than one heat exchangers 108 are present, the heat exchangers 108 operate in parallel. Each heat exchanger 108 consists of at least one flow path 110, which flow paths 110 operate in parallel. The heat exchangers 108 are within the vessel 100. Each flow path 110 of each heat exchanger 108 has a thermocouple 111, such as a thermocouple, coupled to it. The thermocouple 111 is located such that the temperature which it senses is the temperature of the cryogen flowing through a flow path 110 after the cryogen has absorbed thermal energy from the liquid within the vessel 100. A cryogen valve heat exchanger 103 is coupled to the flow paths 110 to add thermal energy to the cryogen within them downstream of the vessel 100. A cryogen valve 109 is coupled to each flow path 110. If the temperature of a flow path 110 as sensed by the thermocouple 111 relating to the flow path 110 reaches below a selected value, the cryogen valve 109 closes and doesn't allow cryogen flow within that flow path 110. Alternately, thermocouple, a cryogen valve heat exchanger, and a cryogen valve are located on the heat exchanger after the individual flow paths have rejoined (not shown). The cryogen leaves through a cryogen outlet 101.

Figure 3:
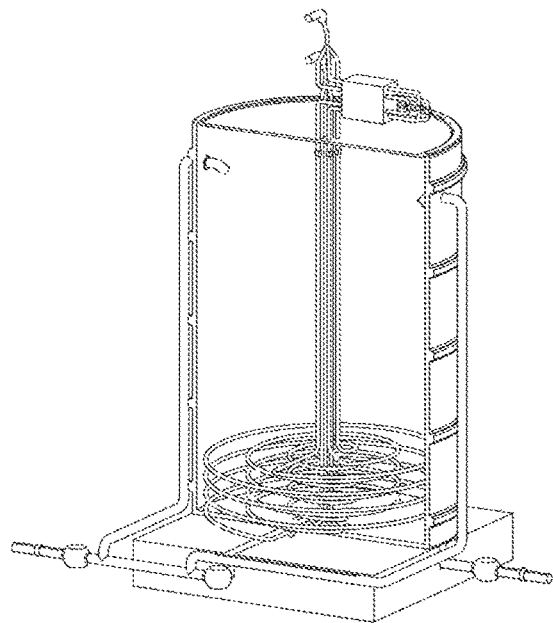
FIG. 3 shows various exemplary cutaway 3D perspective views of the cryogenic liquid chiller demonstrating the invention with various amounts of independent heat exchangers.
Figure 3:
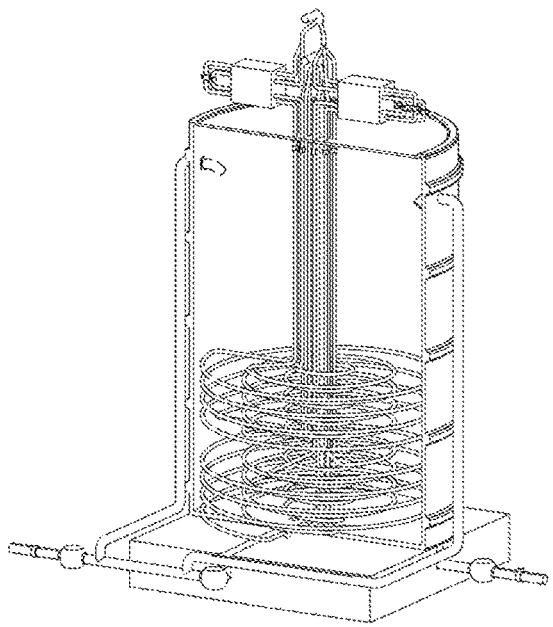
Figure 3:
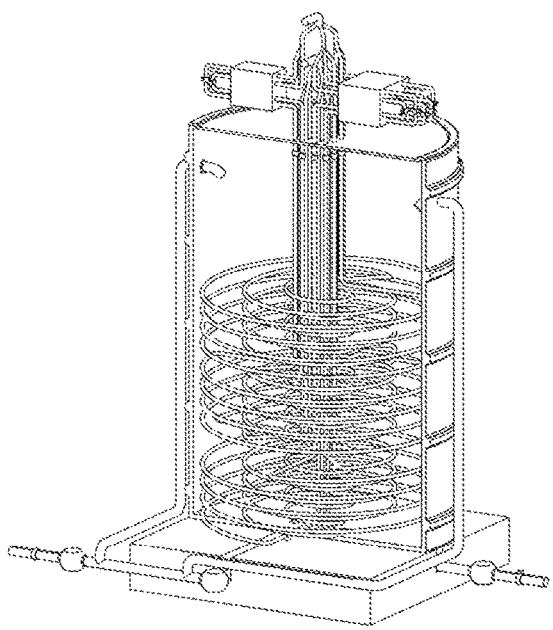
Figure 3:
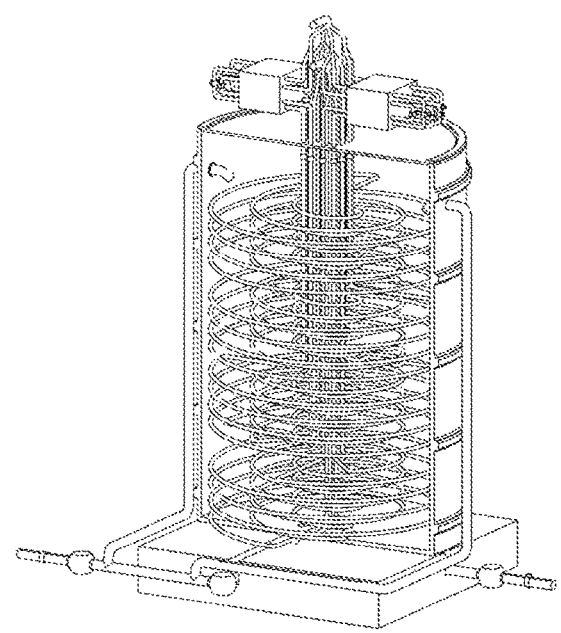
Figure 4:
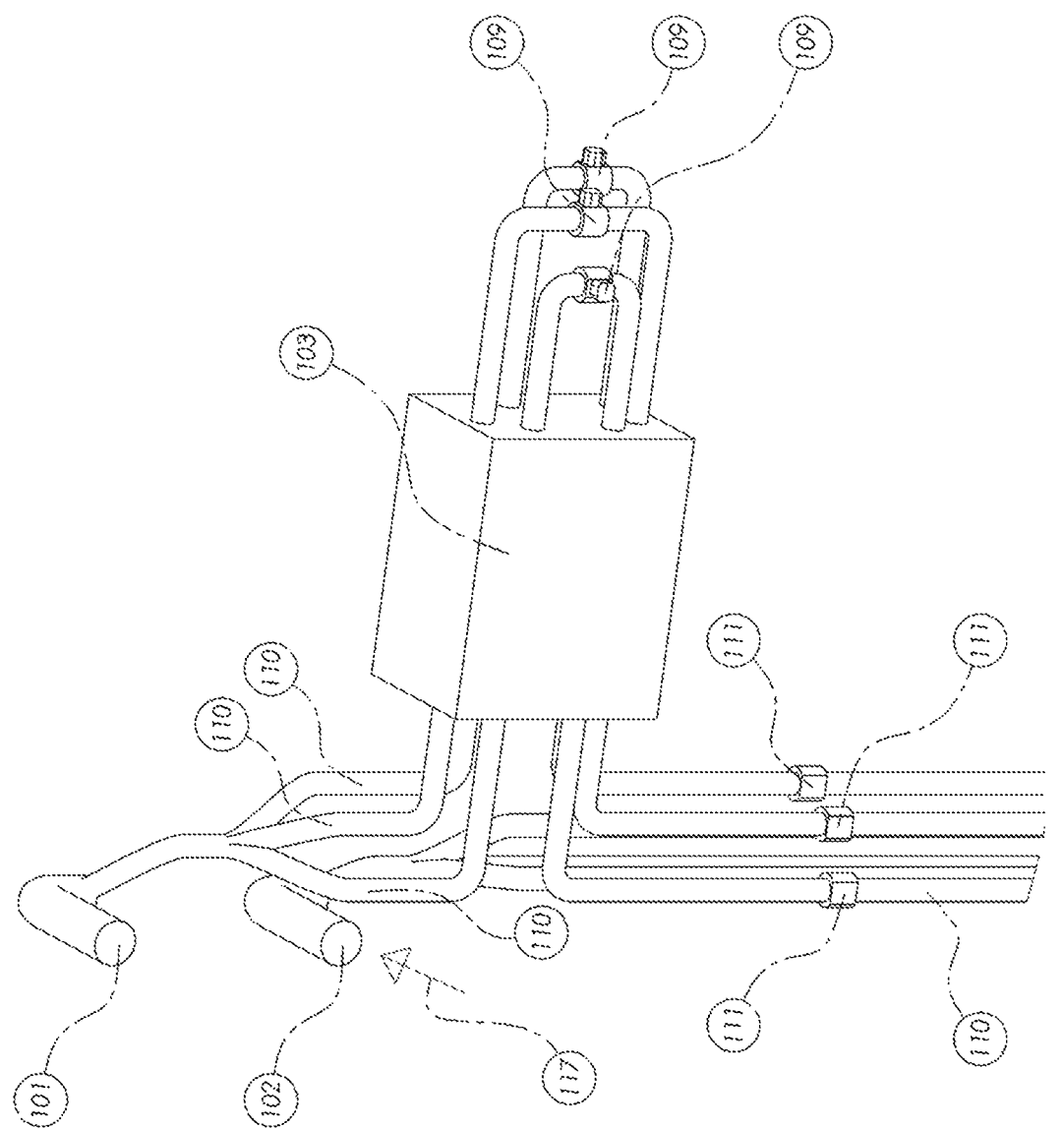
FIG. 4 is an exemplary 3D perspective view of a section of the cryogen flow path in a heat exchanger.
Figure 4:
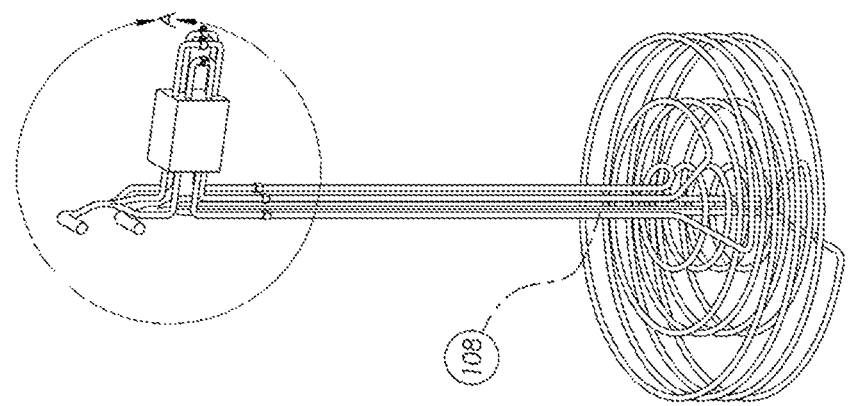
Figure 5:
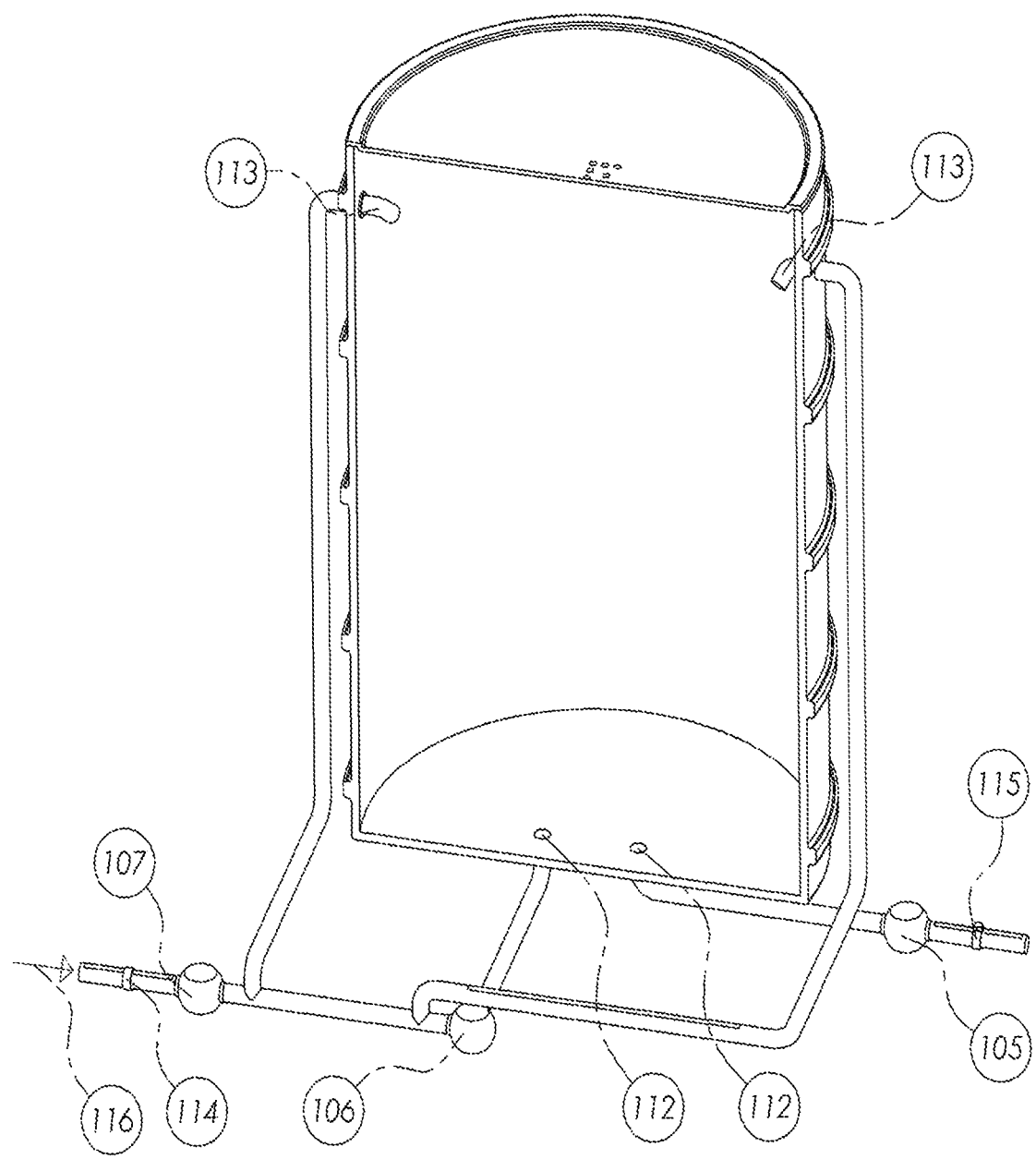
FIG. 5 is an exemplary cutaway 3D perspective view of the cryogenic liquid chiller highlighting the plumbing for one embodiment of the circulation, filling, and draining systems.

In one embodiment, a vessel 100 has only one heat exchanger 108, as shown by "1 Heat Exchanger" in FIG. 3. The fill pump 107 is activated and liquid is drawn from a liquid source 116 and into the vessel 100. The fill pump 107 stops after the liquid level is several inches above the top of the heat exchanger 108. The cryogen valves 109 associated with the flow paths 110 of the heat exchanger 108 open, allowing cryogen flow from a cryogen source 117 into a cryogen inlet 102 and through the heat exchanger 108. Thermal energy from the liquid within the vessel 100 is transferred to the cryogen. Advantages of the modular heat exchanger of the present invention include increased capability for a smaller liquid quantity. When the liquid level is below the top of the heat exchanger, effective surface area for cooling decreases, thus decreasing performance.

In another embodiment, a vessel 100 has only one heat exchanger 108, as shown by "1 Heat Exchanger" in FIG. 3. The fill pump 107 is activated and liquid is drawn from a liquid source 116 and into the vessel 100. The fill pump 107 stops after the liquid level is to the top of the vessel 100. The cryogen valves 109 associated with the flow paths 110 of the heat exchanger 108 open, allowing cryogen flow from a cryogen source 117 into a cryogen inlet 102 and through the heat exchanger 108. Thermal energy from the liquid within the vessel 100 is transferred to the cryogen. Advantages of the modular heat exchanger of the present invention include similar cooling capability to prior art for large liquid quantities while retaining increased cooling capability for smaller liquid quantities. The cooling capability of a heat exchanger with a set amount of effective cooling surface decreases as the fluid to be cooled decreases its contact with the effective cooling surface. A modular heat exchanger positioned near the bottom of a fluid retains all of its effective cooling surface in contact with the fluid for more levels of fluid when compared to traditional heat exchangers that have their effective cooling surfaces spaced out more within the vessel retaining the fluid. Thus, the modular heat exchanger of the present invention is advantageous.

In another embodiment, a vessel 100 has two heat exchangers 108, as shown by "2 Heat Exchangers" in FIG. 3. The fill pump 107 is activated and liquid is drawn from a liquid source 116 and into the vessel 100. The fill pump 107 stops after the liquid level is several inches above the top of the heat exchangers 108. To optimize efficiency, only some of the cryogen valves 109 associated with the flow paths 110 of the heat exchangers 108 open, allowing cryogen flow from a cryogen source 117 into a cryogen inlet 102 and through the heat exchanger 108 through the selected flow paths 110. Alternately, to optimize cooling performance, all of the cryogen valves 109 associated with the flow paths 110 of the heat exchanger 108 open, allowing cryogen flow from a cryogen source 117 into a cryogen inlet 102 and through the heat exchangers 108. The modular and independent heat exchangers of the present invention allow for greater control over efficiency and performance and is advantageous.

Similarly, other embodiments have three or more heat exchanger 108 and can offer greater control over efficiency and performance in like way.

In another embodiment, a vessel 100 has four heat exchangers 108, as shown by "4 Heat Exchangers" in FIG. 3. The fill pump 107 is activated and liquid is drawn from a liquid source 116 and into the vessel 100. The fill pump 107 stops after the liquid level reaches the selected level. All of the cryogen valves 109 associated with the flow paths 110 of the heat exchangers 108 open, allowing cryogen flow from a cryogen source 117 into a cryogen inlet 102 and through the heat exchanger 108 through the flow paths 110. A thermocouple 111 is coupled to each flow path 110 at a point downstream of where the bulk amount of heat transfer occurs. Thermal energy is transferred from the liquid within the vessel 100 to the cryogen within the flow paths 110. As the temperature of the liquid within the vessel 100 decreases, or as the flow rate of cryogen within the flow paths 110 increases, the amount of thermal energy transferred from the liquid within the vessel 100 to the cryogen within the flow paths 110 decreases and the temperature at the point sensed by the thermocouple 111 decreases. The efficiency of thermal energy transfer decreases as the temperature of the cryogen within the flow paths 110 decreases at a rate greater than the temperature within the vessel 100 decreases. Lower efficiency is equivalent to more cryogen usage per unit liquid chilled. As the temperature sensed by the thermocouple 111 reaches below a certain point, the cryogen valve 109 corresponding to the flow path 110 whose temperature was measured below a certain point closes. The closing of the cryogen valve 109 halts cryogen flow within the corresponding flow path 110. Thermal energy is transferred from the liquid within the vessel 100 by convection with the exterior surface of the flow path 110. This convection rate is dependent upon the temperature of the exterior surface of the flow path 110 and not directly by the cryogen flow within the flow path 110. The largest thermal energy transfer occurs as the temperature gradient between the flow path 110 and the liquid within the vessel 100 is largest. Typically, cryogen flow is required to keep the exterior surface of the flow path 110 cold enough to cause this large thermal gradient. In contrast, the most efficient usage of cryogen occurs when the cryogen within the flow path 110 and the liquid within the vessel 100 have equal temperatures. Stopping the cryogen flow within a flow path 110 as its temperature is below temperature of the liquid within the vessel 100 by a certain amount will increase efficiency. Alternatively, all cryogen valves 109 can remain open to allow maximum cryogen flow rate within the flow paths 110 in order to maximize the thermal gradient, or in other words, to allow maximum cooling capability. The capability of the cryogen valves of the present invention to be open or closed independently allows for control over the efficiency of each individual flow path while also being capable of maximizing cooling capability by retaining all cryogen valves open.

In another embodiment, while cryogen is flowing through the heat exchangers 108, a circulation pump 106 is causing liquid flow through the vessel 100. This increased flow causes increased thermal energy transfer between the cryogen in the flow paths 110 and the liquid in the vessel 100. The angling and multiplicity of the circulation outlets 113 cause increased uniform flow across all the liquid and not just currents within bodies of stationary liquid. This increased flow uniformity increases temperature uniformity within the liquid as well as increases the thermal energy transfer rate. The increased temperature uniformity and the cooling capability of the present invention allows for precise control of temperature of the liquid while retaining high performance, a great benefit.

In another aspect, a cryogenic liquid chiller includes a modular heat exchanger system and increased liquid flow system that allows for precise control of liquid temperature down to extremely low temperatures at an extremely fast rate.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A cryogenic liquid chiller to cool a liquid, comprising:
   a vessel to receive the liquid to be cooled;
   a first heat exchanger located near the bottom of the vessel and having a cryogenic input port with parallel cryogenic paths, said first heat exchanger having concentric coils with first and second vertical paths connected thereto;
   a cryogen valve;
   one or more additional heat exchangers each having concentric coils with separate flow paths coupled in parallel to the cryogen valve further coupled to a pressurized cryogen source with parallel cryogenic paths in relation to the first heat exchanger and the one or more additional heat exchangers, wherein the first heat exchanger has a plurality of concentric heat exchange coil sections with different diameters nested inside each other with a predetermined submerged height;
   a circulation pump to circulate the liquid in the vessel;
   a motor providing a fill pump to move the liquid into the vessel from a liquid source in one direction and in a second direction providing a drain pump to move the liquid out of the vessel.

2. The chiller of claim 1, comprising insulation coupled to the vessel.

3. The chiller of claim 1, comprising a cryogen or liquid nitrogen to cool the liquid.

4. The chiller of claim 1, comprising a thermocouple.

5. The chiller of claim 4, wherein the cryogen valve allows cryogen flow when the temperature of said flow path is above a selected value.

6. The chiller of claim 1, wherein the circulation pump pumps liquid from the vessel through at least one circulation inlet.

7. The chiller of claim 1, wherein the circulation pump pumps liquid to the vessel through at least one circulation outlet.

8. The chiller of claim 6, wherein the at least one circulation inlet is located on the floor of the vessel.

9. The chiller of claim 6, comprising a second circulation inlet.

10. The chiller of claim 7, wherein the at least one circulation outlet is offset from the bottom of the vessel by a selected amount.

11. The chiller of claim 1, comprising a check valve located between the fill pump and the liquid source to stop fluid flow from the vessel into the liquid source.

12. The chiller of claim 1, comprising a manual valve in series with the drain pump.

13. The chiller of claim 11, comprising a manual valve in series with the drain pump.

14. The chiller of claim 13, wherein the circulation pump is coupled to the fill pump.

15. The chiller of claim 1, comprising an alcohol solvent.

16. The chiller of claim 1, wherein the one or more additional heat exchangers are stackable.

17. The chiller of claim 1, wherein the first heat exchanger comprises three concentric coils.

\* \* \* \* \*